United States Patent Office 2,816,037
Patented Dec. 10, 1957

2,816,037

UTILIZATION OF BY-PRODUCT POTATO PIECES

Robert L. Olson, and Winfred O. Harrington, Berkeley, and Peter C. Mayer, El Cerrito, Calif., assignors to the United States of America as represented by the Secretary of Agriculture No Drawing. Application February 14, 1955, Serial No. 488,171

2 Claims. (Cl. 99—154)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

A recent development in the food industry is the production of pre-peeled fresh potatoes for use in making French-fried potatoes. The process as generally carried out involves the following steps: Raw potatoes are peeled, washed, and sliced. The sliced potatoes are then dipped in a sulphiting bath to prevent discoloration, packaged in bags made of waxed-paper, cellophane, polyethylene, etc., and kept under cold storage conditions of referigeration (about 35–45° F.) until used. Such products serve as a convenient source of potatoes for making French fries and are purchased in considerable quantities by hotels, restaurants, hospitals, caterers, etc. The products, it is to be understood, are not intended to be preserved indefinitely but are meant to be used in a maximum of about 10 days after preparation.

In the above process considerable loss is involved in that during the cutting of the tubers into pieces suitable for French frying substantial quantities of slivers of potato material are obtained. These undersized or irregular pieces cannot be sold as a source of French fried potatoes and are at present regarded as a total waste. One plant, for example, obtains several thousand pounds per day of these slivers and disposes of them by dumping or for use as hog feed.

Various attempts have been made to devise a suitable outlet for the undersized and irregular pieces. For example, it has been proposed that they be utilized as a stock for preparing hash-brown potatoes in restaurants or institutions. To prepare them for such use the pieces must be cooked then packaged and maintained under refrigeration until prepared for use which entails pan frying them. Such a product is entirely unsatisfactory because when the pieces are cooked in steam or water they mat together to form an unattractive mass. The reason for this matting is that the cutting operation releases starch to the surfaces of the pieces and during the cooking step this starch acts as an adhesive and causes the individual pieces to cohere into a large mass. In attempts to alleviate this problem the pieces were thoroughly water washed prior to cooking. By this treatment, free starch was removed so that the pieces did not mat during cooking. However, when the resulting products were pan-fried they did not brown uniformly and required excessive time and temperature to develop desirable color. Further, they appeared wet and greasy after frying. The reason for this behavior of the washed pieces is that the washing step in addition to removing starch removes what may be termed browning constituents, that is, sugars and soluble nitrogenous components such as amino acids, peptides, etc. In the absence of such constituents, the potatoes do not color properly when fried. In an attempt to restore the browning characteristics, the washed pieces of potato were dipped in a solution containing glucose. On pan-frying, such products did not yield a satisfactory dish of hash-browned potatoes in that the browning was very localized being limited to those surfaces which were in actual contact with the hot griddle. In addition the colored areas were an intense brown. The fried product therefore did not resemble an ordinary dish of hash-browned potatoes made as in the home for example, by cooking whole potatoes, cutting them into strips and then frying the strips. In such case the brown color tends to be somewhat diffused so that areas of the material not actually in contact with the griddle assume a somewhat brown shade and the over-all color is a golden brown color, not the intense brown obtained with the glucose-treated pieces.

It has now been found that the undersized and irregular potato pieces serve as a useful stock for making hash-browned potatoes if they are blended with a product made by cooking whole peeled potatoes and cutting the cooked whole peeled potatoes into strips. The blended product, it has been observed, will pan-fry to produce an attractive, non-greasy, dry dish of hash-browned potatoes which has a desirable over-all golden brown color and in which the brown areas are not localized but are diffused through the mass of pieces.

In applying this invention in practice, the pieces of raw potato (obtained, for example, as a by-product from the manufacture of pre-peeled stock for French-fried potatoes), are, if necessary, cut into smaller pieces, for example, by running them through a shoestring cutter. The potato pieces are then thoroughly washed with water to remove the free starch from the surfaces. The washed pieces are then cooked by subjecting them to steam for sufficient time to make them tender but not mushy. Usually steam treatment for about 5–15 minutes is applied. The cooked pieces are then allowed to stand to cool or cooled by spreading them out and blowing air over them.

If desired, the pieces may be treated with a solution of a reducing sugar such as glucose, fructose, maltose, etc. so that on eventual frying they will color to a greater extent. A preferred treatment involves dipping them in an aqueous solution containing about 10% of corn syrup for about 3 minutes. By varying the concentration of reducing sugar in the dipping bath and/or by varying the time of residence in the bath, the browning properties of the pieces may be adjusted to any desired level. The treatment with the reducing sugar may be applied before or after cooking.

Whole peeled potatoes are cooked in steam or water until tender but not long enough to make them soft or mushy. The cooked potatoes are then allowed to cool to about room temperature then grated or cut into suitable shapes such as shoestrings.

The potato pieces which have been subjected to washing and cooking, with or without addition of reducing sugar, are then mixed with the product made by subjecting whole potatoes to cooking and cutting using a ratio of about 0.5 to 1 part of the former per part of the latter.

The composite potato product is then packaged, for example, in bags made of waxed paper, cellophane, or the like, and maintained under refrigeration (about 35–45° F.) until used. The product can be kept under such conditions for about 10–12 days.

In utilizing the product, the cook need but empty some of the product into a skillet containing a thin layer of cooking fat and fry the resulting patty on both sides for several minutes. The product fries readily to a uniformly golden brown dish of attractive dry and non-greasy appearance and excellent flavor.

The invention is further illustrated by the following example.

(A) A lot of pieces of raw potato were run through a shoestring cutter, the pieces being then washed thoroughly in running water to remove starch from the cut surfaces. The pieces were then immersed for 3 minutes in an aqueous solution containing 10% of corn syrup (mostly glucose and dextrins). The solution contained approximately 5% of reducing sugars. The sugar-treated pieces were cooked by exposing them to steam for 15 minutes then allowed to cool.

(B) Whole peeled potatoes were steam cooked for 25 minutes, cooled, then cut into shoestring shape.

(C) Products A and B were mixed in a 0.5 to 1 ratio.

(D) Products A and B were mixed in a 1 to 1 ratio.

All of the above products (A, B, C, and D) were prepared for the table in the way customary for making hash-browned potatoes by frying on a hot griddle covered with a thin layer or film of cooking fat.

The fried products were appraised for appearance and the following results were obtained:

Product A (potato pieces which had been washed, sugared, and cooked): The fried dish was not acceptable because of intense brown areas on those portions of the pieces which had been in actual contact with the griddle. In addition the dish had a moist, greasy appearance.

Product B (whole potatoes cooked and cut): As would be expected, this material fried to an attractive dry and non-greasy dish in which the golden brown color was well diffused throughout the mass.

Products C and D (made in accordance with this invention with ratios of 0.5 to 1 and 1 to 1, respectively): Both produced fried dishes of an attractive dry and non-greasy appearance in which the golden brown color was well diffused throughout the mass. Product C could not be distinguished from product B, whereas product D was slightly inferior to product B but the difference could only be detected by minute examination.

Having thus described the invention, what is claimed is:

1. A process for utilizing slivers of raw potato which are a by-product in the production of pre-peeled fresh potatoes for use in making French-fried potatoes and which slivers of raw potato are obtained in large quantities by potato processors and are normally a waste product, comprising washing the slivers of raw potato to remove surface starch, cooking the washed slivers in steam, mixing about 0.5 to 1 part of the resulting washed cooked slivers with one part of a product made by cooking whole potatoes and then cutting them into pieces, and thereafter storing the mixed product under refrigeration for use as a convenient stock for preparing hash-brown fried potatoes.

2. The process of claim 1 wherein the washed slivers of raw potato are treated with a reducing sugar prior to further processing.

References Cited in the file of this patent
UNITED STATES PATENTS
Re. 23,890    Chase _____ Nov. 2, 1954
OTHER REFERENCES
"Food and Food Products," Jacobs, vol. II, page 1321.